United States Patent [19]

Ifield et al.

[11] E Re. 29,000

[45] Reissued Oct. 12, 1976

[54] HYDRAULIC ACTUATOR

[75] Inventors: Richard J. Ifield; William R. Ifield, both of Dural, Australia

[73] Assignee: R. J. Ifield & Sons Pty. Limited, Dural, Australia

[22] Filed: Mar. 21, 1974

[21] Appl. No.: 453,506

Related U.S. Patent Documents

Reissue of:

[64] Patent No.: 3,703,851
Issued: Nov. 28, 1972
Appl. No.: 101,089
Filed: Dec. 23, 1970

[30] Foreign Application Priority Data

Jan. 6, 1970 Australia ..... 18/70

[52] U.S. Cl. ..... 91/174; 74/29; 74/88; 91/189 R; 91/411 A; 91/459; 92/3; 92/31; 92/75; 92/108; 92/113; 92/129; 92/136; 92/138; 92/151

[51] Int. Cl.[2] ..... F01B 1/08; F01L 15/00; F01L 33/00; F16H 19/04

[58] Field of Search ..... 74/29, 88; 91/174, 411 A, 91/189, 459; 92/3, 31, 75, 50, 69, 108, 113, 116, 129, 136, 138, 150, 151

[56] References Cited

UNITED STATES PATENTS

| | | | |
|---|---|---|---|
| 2,808,033 | 10/1957 | Geier et al. | 92/31 X |
| 2,970,574 | 2/1961 | Geyer | 92/33 X |
| 2,979,034 | 4/1961 | Geyer | 92/33 X |
| 3,000,357 | 9/1961 | Geyer | 92/33 X |
| 3,090,360 | 5/1963 | Bennett et al. | 91/36 X |
| 3,179,015 | 4/1965 | Kurt | 92/136 X |
| 3,187,592 | 6/1965 | Geyer | 92/33 X |
| 3,414,693 | 12/1968 | Watson et al. | 92/5 X |
| 3,425,285 | 2/1969 | Kandell et al. | 74/29 |

*Primary Examiner*—Martin P. Schwadron
*Assistant Examiner*—Abraham Hershkovitz
*Attorney, Agent, or Firm*—Stevens, Davis, Miller & Mosher

[57] ABSTRACT

A hydraulic actuator for producing translational movement over a long distance having two jack cylinders with pistons mounted for reciprocal movement and connected to a worm wheel through a worm gear. When a piston is driving, the worm gear acts as a rack to turn the worm wheel and when a piston is being returned to its starting position the worm gear rotates. Means are provided to alternately switch from one cylinder to the other.

2 Claims, 5 Drawing Figures

HYDRAULIC ACTUATOR

Matter enclosed in heavy brackets [ ] appears in the original patent but forms no part of this reissue specification; matter printed in italics indicates the additions made by reissue.

This invention relates to actuators for the movement of substantial loads through substantial distances.

Actuators of the kind to which the invention relates may be used, for example, for the lifting or hauling of heavy loads, the straining of pre-stressing cables in concrete structures, the rotation of machine elements against the effects of heavy restraining torques and the like.

Many relatively simple actuators are known for the shifting of heavy loads through short distances, for example, mechanical or hydraulic jacks, but prior known actuators for producing translational motion over a long distance or continuous rotary motion have been elaborate and therefore expensive.

An object of the present is to provide an actuator of the kind under discussion which is relatively simple in construction and, therefore, inexpensive to manufacture.

The invention achieves that object by the provision of two hydraulic jack cylinders which work in concert and which are effective to move a load in increments with one jack cylinder taking over from the other at the end of each increment to provide substantially continuous motion.

Thus, the invention consists in an actuator comprising a body structure defining two jack cylinders and ducts for the supply of pressurized hydraulic fluid to, and exhuast of fluid from, said jack cylinders, two pistons disposed one in each cylinder, changeover valve means controlling the admission and exhaust of fluid to and from said cylinders in a manner causing said pistons to reciprocate through power and return strokes with the power stroke of one piston alternating with that of the other and with substantially no time delay between successive power strokes, and power transmission means which drive-connect each said piston to a load to be moved during the piston's power stroke but release each piston from the load during the piston's return stroke.

According to the invention the power transmission means comprises a helicoidal element, such as a nut or a worm which engages a co-acting loaded element, such as a threaded shaft or a worm-wheel, together with means to rotate the helicoidal element during the return stroke of its associated piston to permit the helicoidal element to move translationally relative to the loaded element. On the other hand, during the power stroke of its associated piston the helicoidal element is not rotated and, thus, translational movement imparted to it by its associated piston causes the required motion of the loaded element, which is thereby transmitted to the load to be moved.

The invention is applicable to the rotation of a load in either direction in a controlled and irreversible manner. For example, it may be incorporated in the drive for slewing a large crane, turning a winch drum or similar application. It is also applicable to providing a continuous linear motion on a long shaft.

Certain embodiments of the invention will now be described with reference to the accompanying drawings in which.

Figure 1:
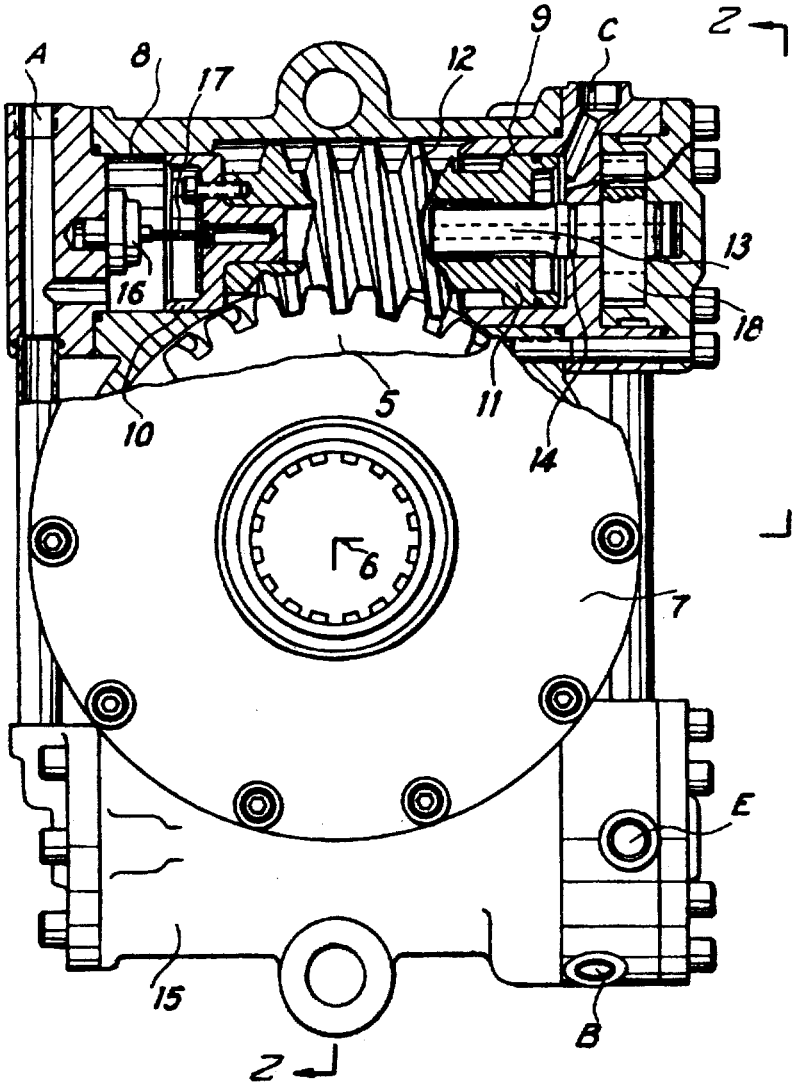
FIG. 1 shows, in front elevation and partly in section, an actuator adapted for rotary motion.
Figure 2:
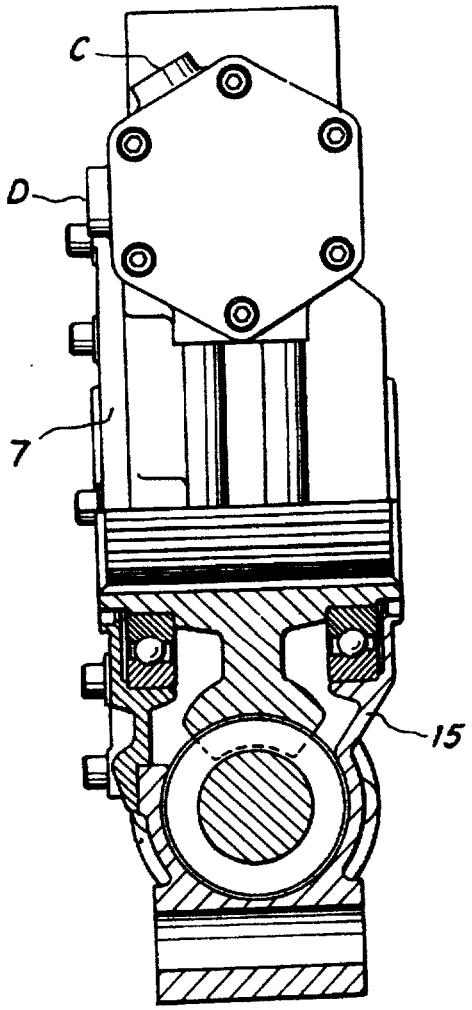
FIG. 2 shows, in end elevation and partly in section, a view along the line 2—2 of FIG. 1.

Upon referring to FIGS. 1 and 2 of the drawings it will be seen that the drive transmission means include a loaded element — that is to say an element which carries or is connected to the load to be moved — in the form of a worm-wheel 5 mounted for rotation about an axis 6 which is fixed relatively to the body structure 7 of the actuator.

The body structure 7 enclosing the worm wheel contains pairs of jack cylinders such as 8 and 9 with closed ends and having their axes tangential to and in the same plane as the worm wheel 5. For continuous rotation of the worm wheel at steady torque there must be at least two pairs of such jack cylinders, but any greater number of pairs may be employed to increase the driving torque for a given maximum worm tooth loading, the number being limited only by the available peripheral space around the worm wheel. In order to simplify the description, it will be assumed that only two pairs of cylinders are employed.

A respective pair of jack pistons 10 and 11 is slidably mounted in jack cylinders 8 and 9. The jack pistons have a sealed piston head at each end sliding in the jack cylinders. The center portion of the jack pistons is of helicoidal form as a worm 12 engaging the teeth of the worm wheel 5. Preferably the worm has a single start and is irreversible. Each pair of jack pistons has a slidable drive connection such as 13 passing through a seal such as 14 in the end wall of cylinder 9, to provide means for rotating the worm 12 on its unloaded return stroke.

Purely for descriptive purposes, where it is necessary to distinguish between them, the pair of jack cylinders 8 and 9 and its associated jack, drive shaft and other associated components will be referred to as the first and the other pair of jack cylinders and its associated jack, drive shaft and other associated components enclosed within the housing 15 will be referred to as the second components as named.

The body structure 7 also defines ducts for the supply of pressurized fluid to and the exhaust of fluid from the closed ends of the cylinders.

One end of the second pair of cylinders has a duct B. The adjacent end of the first pair of cylinders has a duct C. The opposite ends of the pairs of cylinders are adjacent to one another and are interconnected with a common duct A.

For one direction of drive, duct B is at high pressure continuously and duct C is at low pressure continuously. These pressures are reversed for the opposite direction of drive.

Duct A is connected to any suitable automatic valve (see FIG. 5), oscillating to pressurize and exhaust the duct. The automatic valve may be an electric solenoid operated valve responsive to the triggering of the double acting micro switch 16 operated by the lost motion stop rod 17 at each end of the stroke of piston 10, or it may be any other form of snap action valve, triggered at each end of the piston stroke. The micro switches or other triggering devices are required at only one pair of pistons, in this case the first pair. Because the automatic valve is triggered at each end of the stroke of the first pair of pistons some excess movement may be allowed at these pistons to ensure triggering of the valve before the piston 10 reaches the limits of its movements.

It will be assumed that clockwise rotation of the worm wheel is desired and this is provided when duct B is at high pressure and duct C is at low pressure.

When duct A is exhausted to low pressure through the automatic valve, the pressure at duct B thrusts the second piston axially to rotate the worm wheel clockwise, the worm teeth acting as rack teeth during this motion. During this operation there is no pressure difference at the first pair of pistons.

When duct A is pressurized through the automatic valve, there is no pressure difference at the second pair of pistons and the first piston is thrust axially to rotate the worm wheel clockwise, the worm teeth acting as rack teeth during this motion.

During the period when one pair of pistons is thrusting axially to rotate the worm wheel, the other pair of pistons must return to their starting point ready for the next power stroke. This is achieved by rotating the pistons with their associated worm so that they screw back to their starting point. There is no loading on the pistons during their return stroke so that they may be rotated with a relatively small power supply. This rotation may be provided by small electric or hydraulic motors, such as the hydraulic motor 18, but the pistons must be returned fully before the other pair of pistons have reached the end of their power stroke, in order to ensure continuous operation.

The direction of rotation of the motor or motors, which rotate the pistons on their return strokes, must be reversed for the opposite direction of rotation of the worm wheel.

Because the switching mechanism for the automatic valve is associated only with the first pair of pistons, this pair of pistons will always operate over the full stroke. For a given worm wheel speed, the stroke of the second pair of pistons will depend on the speed of the return stroke of the first pair of pistons, which must trigger the automatic valve before the second pair of pistons reach the limit of the power stroke.

Instead of employing a separate motor to rotate each pair of pistons on the return stroke, a single motor (not shown) may drive the two pairs of pistons through differential gearing (not shown).

Because the worm drive is irreversible, the worm wheel is held against rotation when the power is shut off.

If it is desired to hold the worm wheel without backlash, one of the two piston rotating motors may be reversed, without reversing the other, or the automatic valve may be prevented from operating. In either case the two pairs of pistons would then move to their adjacent stops, which prevents movement in either direction of rotation of the worm wheel.

Figure 5:
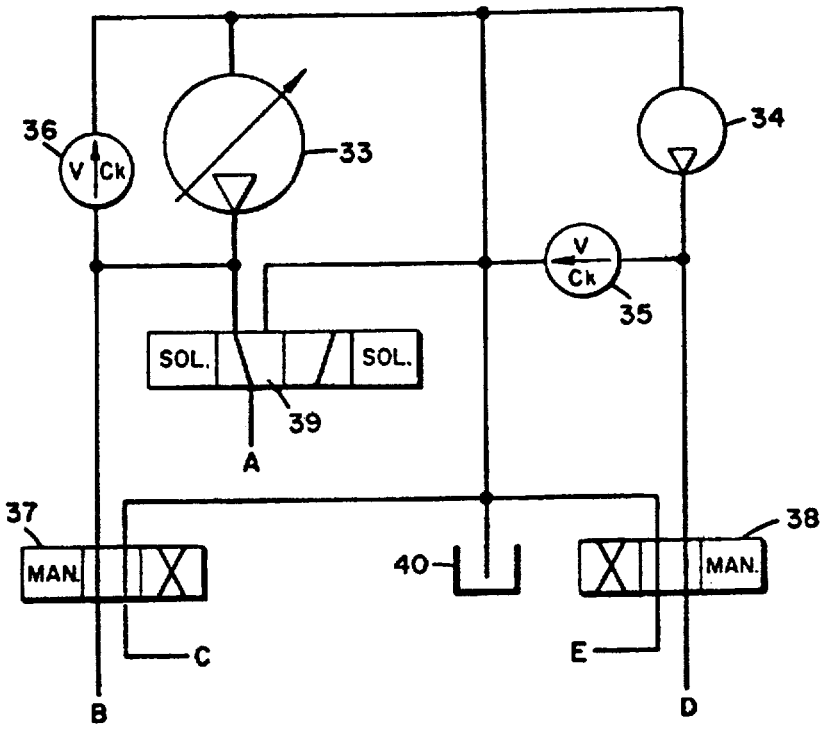
*FIG. 5 is a schematic diagram for the hydraulic circuit.*

There is a variety of different arrangements of pumps and valves which are suitable for the power supply and these do not form part of the invention. One suitable arrangement is shown diagrammatically at FIG. 5 to clarify the operation of the actuator, as described with reference to FIG. 1. The connections to the actuator ducts are identified in FIG. 5 by similar letters. FIG. 5 shows a separate pump to power the small motors 18 shown on FIG. 1, these have a common inlet duct and a common delivery duct, which are reversible for the opposite direction of rotation and are identified by the letters D and E.

FIG. 5 shows diagrammatically a main variable displacement power supply pump 33, the output of which determines the rotational speed of the actuator. A small fixed displacement pump 34 is shown to rotate the motors 18 during the unloaded return strokes of the pistons; the output of this pump must be adequate to return the pistons fully on their return strokes for the highest actuator speed and the excess flow from the pump is discharged through the relief valve 35. A relief valve 36 is also shown to prevent overload at the main pump 33. Two manually operated reversing valves 37 and 38 are shown to reverse the high and low pressures to ducts B and C and to reverse the direction of rotation of the small motors 18, FIG. 1 when it is required to reverse the direction of rotation of the actuator.

The automatic valve previously referred to is shown at 39 as a solenoid operated valve, the *valve* previously being energized in response to the movements of the previously described microswitch 16, at each end of the stroke of the worm 12. The movements of this automatic valve cause the duct A to alternate between the pressure supply from the pump 33 and the discharge to the reservoir 40.

Figure 3:
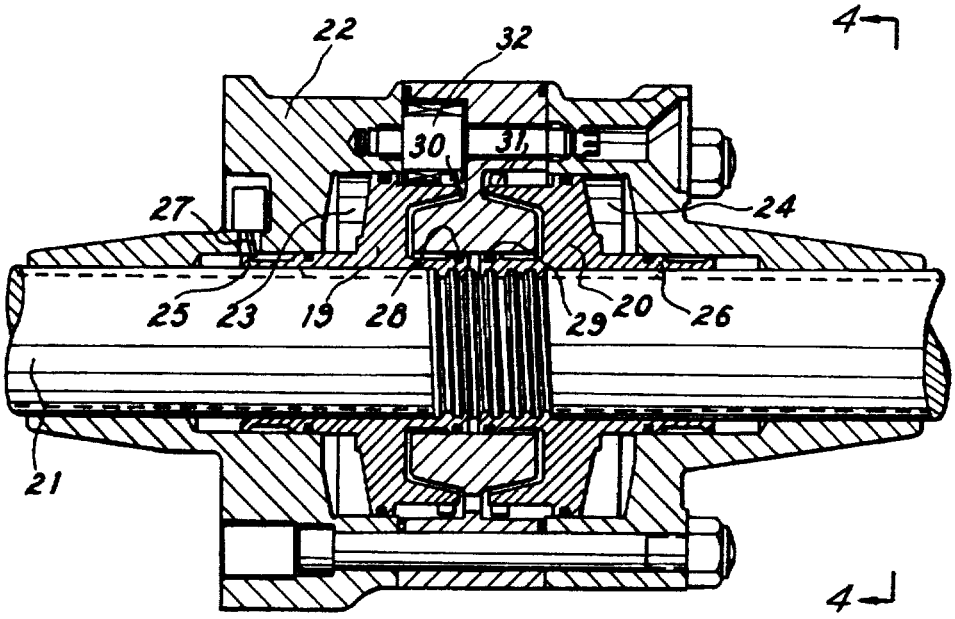
FIG. 3 shows, in front elevation and partly in section, an actuator adapted for translational motion, [ and ]
Figure 4:
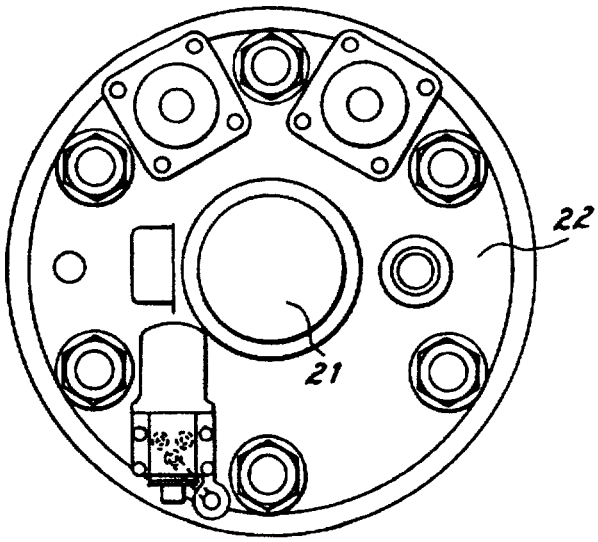
FIG. 4 shows, in elevation, a view along the line 4—4 of FIG. 3, *and*

According to a second embodiment of the invention a linear actuator is provided, as shown in FIGS. 3 and 4.

In this instance, the two jack pistons may be in the form of nuts 19 and 20 on a threaded shaft 21, being the helicoidal member to which the load to be moved is connected *wherein the load prevents rotation of the shaft 21.*

The body structure 22 surrounds the threaded shaft which extends co-axially through the two jack cylinders 23 and 24. The jack cylinders may be opposite end portions of a single cylindrical cavity and both jack pistons may have respective axially extending skirts 25 and 26 thereon which project through sealing glands at the outer ends of the cylindrical cavity. Furthermore, the jack pistons may have inwardly direct skirts thereon, slidable telescopically within the housing 22, and each having respective annular fluid seals 28 and 29 to prevent leakage of fluid from the cylinders to the screw-threaded shaft.

Each jack piston may have a respective spur gear 30 and 31 fixed to its outwardly projecting skirt outside the jack cylinder space and said spur gears may mesh respectively with pinions such as 32 driven by return motors as described in the first embodiment of the invention.

As in the first embodiment, duct A leads to the space between the two pistons, duct B leads to one closed end of the cylinder and Duct C leads to the other closed end of the cylinder.

The double acting micro switch 27 or other triggering mechanism (see FIG. 5) for the automatic valve may be operated at the ends of the strokes of the first piston as previously described in the first example of the invention.

As described in the first embodiment the two return motors may be replaced by a single motor, rotating the two pistons on their return strokes, through differential gearing.

The operation is similar to that described for the first embodiment *and the duct arrangment is identical to that shown in FIG. 1.* Duct A is at high pressure when the pistons are closest together and at low pressure when the pistons are furthest apart. When duct A is at high pressure, the opposite face of the first piston is at low pressure and the piston thrusts the screwed shaft axially; the opposite face of the second piston is at high pressure, so there is no pressure difference and the piston is rotated, screwing along the shaft against the stop, until the first piston triggers the switch. Duct A now changes to low pressure, causing the second piston to thrust on the shaft and allowing the first piston to rotate, screwing along the shaft until it triggers the switch to repeat the cycle of operation.

Where several rotary actuators, as described in the first embodiment, or several linear actuators as described in the second embodiment, are required to operate in parallel and in phase with one another, it is preferred to employ solenoid operated automatic valves, with micro switches triggered by the movements of both jack pistons. In this case the micro switches of each actuator are connected in series pairs and these pairs for all actuators are connected in series, to operate a single automatic valve, or any number of automatic valves. This ensures that all jack pistons operate over their full stroke and that the separate actuators remain in phase with one another, regardless of loading differences, within the limits of one piston stroke.

We claim:

[1. A hydraulic actuator comprising a body structure defining two jack cylinders and ducts for the supply of pressurized hydraulic fluid to, and exhaust of fluid from, said jack cylinders, tow pistons disposed one in each cylinder, each having a helicoidal portion in the form of a screw thread co-acting with a mating portion of an actuator, changeover valve means controlling the admission and exhaust of fluid to and from said cylinders in a manner causing said pistons to reciprocate through power and return strokes with the power stroke of one piston alternating with that of the other and with substantially no time delay between successive power strokes, and means to rotate a selective piston to enable it to move back to its staring position while the other piston drives said mating portion.]

[2. An actuator as claimed in claim 1, wherein said jack pistons have a drive connection passing through a seal, said drive connection being rotatable during the return unloaded stroke of said pistons.]

[3. An actuator as claimed in claim 1, wherein a plurality of said cylinders is disposed in the available peripheral space around said mating portion.]

[4. An actuator as claimed in claim 5, wherein an automatic valve responsive to triggering by path limit detecting means at each end of the stroke of one of said pistons is adapted to pressurize and exhaust said ducts successively with an oscillatory action, whereby no pressure difference exists at one pair of said pistons while one of another pair of said pistons is thrust axially to rotate said mating portion, or to move a linear actuator axially relative to a screwed shaft.]

[5. A hydraulic actuator comprising:

a. a body structure defining two jack cylinders and ducts for the supply and exhaust of pressurized fluid to and from said cylinders, b. two pistons disposed one in each cylinder, each having a screw threaded portion, c. power transmission means threadingly engaging the screw threaded portion of each piston, d. means to rotate a selective piston to enable it to move back to its starting position while the other piston drives said power transmission means, and e. changeover valve means controlling the admission and exhaust of fluid to and from said cylinders in a manner causing said pistons to reciprocate through power and return strokes with the power stroke of one piston alternating with that of the other and with substantially no time delay between successive power strokes.]

*6. A linear actuator comprising a body structure having a first and a second end and defining a first cylinder and a second cylinder; a first annular piston disposed in said first cylinder and a second annular piston disposed in said second cylinder; a first duct means for continuously communicating a first chamber defined by said first end and said first piston with a relatively high pressure source; a second duct means for continuously communicating a second chamber defined by said second end and second piston with a relatively low pressure source; changeover valve means controlling the admission and exhaust of relatively high pressure fluid to and from a third chamber defined between said first and second pistons in a manner causing said pistons to reciprocate through power and return strokes with the power stroke of one piston alternating with that of the other and with substantially no time delay between successive power strokes; a shaft extending co-axially through said pistons in threaded engagement therewith, means for preventing rotation of the shaft and motor means connected to rotate each piston during its return stroke so that upon admitting high pressure to said third chamber said second piston causes axial movement of the shaft in the direction of the second end and the motor means rotates the first piston such as to cause its movement relative to the shaft and the body structure in the direction of the first end, while upon venting said third chamber, said first piston causes axial movement of the shaft in the direction of the second end and the motor means rotates the second piston such as to cause its movement relative to the shaft and the body structure in the direction of the first end.*

*7. The actuator of claim 6, including path limit detecting means and an automatic valve responsive to triggering by said path limit detecting means at each end of the stroke of one of said pistons, said valve being adapted to pressurize and exhaust said third duct successively to produce oscillatory motion of said pistons and ensure there is no pressure difference across each piston during its return stroke.*

* * * * *